March 26, 1963  C. F. KRAMER  3,083,048
VEHICLE BODY AND DOOR HEADER SEALING MEANS
Filed June 27, 1961

CLARENCE F. KRAMER
INVENTOR.

BY John R. Faulkner
John J. Roethel
ATTORNEYS

United States Patent Office 3,083,048
Patented Mar. 26, 1963

3,083,048
VEHICLE BODY AND DOOR HEADER
SEALING MEANS
Clarence F. Kramer, Birmingham, Mich., assignor to Ford Motor Company, Dearborn, Mich., a corporation of Delaware
Filed June 27, 1961, Ser. No. 120,040
6 Claims. (Cl. 296—44)

This invention relates to vehicle body door headers and roof headers and to improved means for sealing the openings between opposing faces of the headers in closed position of the door.

Current styling trends in vehicle body construction indicate that a very thin looking upper door header or frame is highly desirable. It is an object of the present invention to provide a door header or window frame, roof header or rail and seal or weatherstrip construction as a means to meet this styling objective and to improve weather seal retention and water-drain-off.

The improved construction and arrangement embodying the present invention comprises, in combination, a vehicle body header or roof rail including a weatherstrip retention means. Retained in the body header retention means is a first weatherstrip having a deflectable portion extending exteriorly of the weatherstrip retention means. The door header or door window frame is also provided with a weatherstrip retention means which retains a second weatherstrip therein. This second weatherstrip also has a deflectable portion, the latter being adapted in door closed position to provide a primary seal between the door and body headers. A drain trough means adapted to catch water seepage past the door header weatherstrip is included as a part of the door header structure. The drain trough in door closed position is engageable with the body header retained weatherstrip deflectable portion to provide a secondary seal between the headers.

Figure 1:
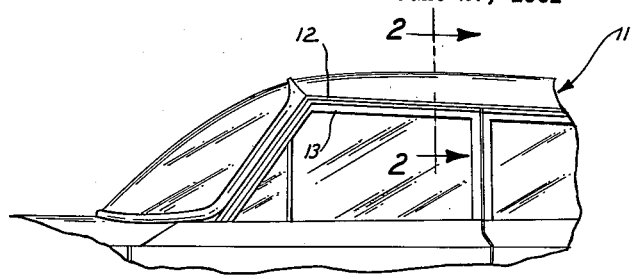
Figure 2:
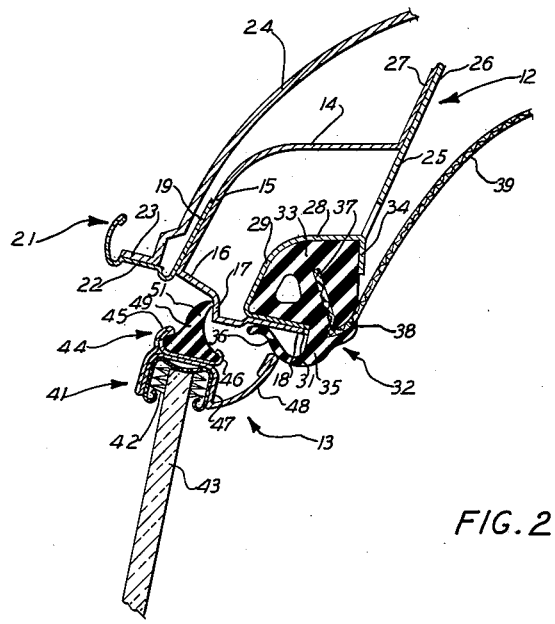

In the interest of minimizing production cost, the body header retained weatherstrip is also constructed and arranged to function as a roof headlining retainer. Other features, objects and advantages of the present invention will be made more apparent as this description proceeds, particularly when considered in connection with the accompanying drawings, wherein:

FIG. 1 is a side elevational view of the upper portion of a passenger vehicle embodying the present invention; and FIG. 2 is an enlarged cross sectional view taken on the line 2—2 of FIG. 1.

Referring now to the drawing, the structural components of the vehicle body 11 embodying the present invention comprise a roof header or roof rail 12 and a door header or window frame 13.

The roof header or roof rail 12 comprises a sheet metal structure having the form of a box channel. It has a substantially horizontal upper wall 14, a sloped outer wall 15 and a stepped lower wall 16. This lower wall 16 is formed with a substantially vertically extending section 17 spaced inwardly of the outer wall 15 and a slightly downwardly inclined section 18 extending inwardly of the section 17.

The sloped outer wall 15 has the inner leg 19 of a U-shaped outer drain trough member 21 welded to it. The base 22 of the trough member 21 receives a flange 23 of the outer roof panel 24, the flange 23 being spot welded or otherwise securely fastened to the trough member base 22.

In addition to the walls 14, 15 and 16 which form three sides of the box channel roof header or roof rail 12, there is a fourth wall 25 which completed the structural box channel and is also shaped to function as a weatherstrip retention means. This fourth wall 25 comprises a sheet metal member having its upper portion 26 welded to an upwardly extending sheet metal member 27 which is integral with the wall 14 of the roof header or roof rail 12. At its lower edge the sheet metal member 26 is formed as a channel having an upper horizontal wall 28, a sloped wall 29 and slightly downwardly inclined wall 31.

It will be noted that the relationship of the walls 28, 29 and 31 are illustrated as being substantially the same as the relationship of the three walls 14, 15 and 16 above described. The channels formed by the walls 28, 29 and 31 may be referred to as the inner channel and the channel formed by the walls 14, 15 and 16 as the outer channel. The walls 31 and 18 of the inner and outer channels abut and are spot welded to each other to complete the structural box channel forming the roof header or roof rail 12.

The inner channel formed by the walls 28, 29 and 31 opens toward the inside of the vehicle body and receives a resilient weatherstrip member, generally designated 32. The weatherstrip member 32 may be formed of molded or extruded rubber and has a main body portion 33 shaped to snugly fit within the inner channel. It is retained in the inner channel by spaced retention tabs 34 turned down from the sheet metal member 26.

The weatherstrip member 32 is provided with a depending leg portion 35 which terminates in a deflectable lip portion 36 which is curled in an outwardly extending direction to underlie the section 18 of the outer channel wall 16.

The main body portion 33 of the weatherstrip 32 is provided with an L-shaped groove 37 therein, the base 38 of the groove opening toward the vehicle interior. The headliner material, generally designated 39, is adapted to have its edge portion inserted into the groove 37 for retention thereby.

The vehicle door header 13 comprises an inverted U-shaped channel section 41 having positioned therein a suitable liner, such as a pile fabric glass run channel 42 of conventional construction. The channel section 41 and its pile fabric liner 42 are adapted to receive the upper edge of a vertically slidable door glass 43 in raised position of the latter.

The inverted U-shaped channel section 41 is topped by a second U-shaped channel section 44 having its outer and inner legs 45 and 46 shaped to form weatherstrip retention members.

The inner leg 47 of the inverted channel section 41 has an upwardly curved flange which, as will be more fully explained, functions as an inner drain trough 48. The door header 13 is illustrated as being rolled from a single sheet of metal to form the back to back channel sections 41 and 44 and the drain trough 48. It is believed readily apparent that the two channel sections 41 and 44 could be separate members spot welded together to form a unitary structure.

The upper channel section 44 receives between its legs 45 and 46 a molded or extruded rubber weatherstrip 49 having an inwardly curled deflectable lip portion 51.

FIG. 2 illustrates the relationship of the body header 12, the door header 13 and the weatherstrips 32 and 49 in door closed position. It will be understood that when the door is open and is then swung in a closing direction, the deflectable lip portion 51 of the weatherstrip 49 will engage the vertical portion 17 of the lower wall 16 of the body header 12 causing an outward deflection of the portion 51 of the weatherstrip. This provides the primary or outer seal between the two headers. Any water seepage between this primary or outer seal will trickle inwardly and downwardly into the drain trough 48. It will be further understood that drain trough 48 will extend across the top of the door to the rear edge thereof where the water may then trickle down the vertical free edge wall of the door. The upper edge of the drain trough, upon closing movement of the door, engages the deflectable lip portion 36 of the weather seal 32 causing the latter to be forced upwardly toward the lower surface of the portion 18 of the roof header wall 18. This provides the secondary seal between the headers, protecting against any overflow from the drain trough 48.

It will be understood that the invention is not to be limited to the exact construction shown and described, but that various changes and modifications may be made without departing from the spirit and scope of the invention as defined in the appended claims.

I claim:

1. In combination, a vehicle body header including integral weatherstrip retention means comprising a laterally opening channel having a lower wall, a first weatherstrip having a body portion retained within said channel and a deflectable portion extending exteriorly of said channel below and in spaced relation to said lower wall, a door header including integral weatherstrip retention means, a second weatherstrip retained by said door header weatherstrip retention means and having a deflectable portion engageable with said lower wall to provide a primary seal between said headers, and drain trough means on said door header adapted to catch water seepage past said second weatherstrip, said drain trough means being engageable with said first weatherstrip deflectable portion to deflect the latter toward said lower wall to provide a secondary seal between said headers.

2. In combination, a vehicle body header including weatherstrip retention means extending along one side thereof, said retention means comprising a laterally opening channel having a lower wall, a first weatherstrip having a body portion retained within said channel, said first weatherstrip having a deflectable portion extending exteriorly of said channel below and in spaced relation to said lower wall in the general direction of the outer side of said header, a door header including weatherstrip retention means, a second weatherstrip retained by said last mentioned retention means and having a deflectable portion engageable with said lower wall between said first weatherstrip deflectable portion and said other side of said body header to provide a primary seal between said headers, and drain trough means on said door header adapted to catch water seepage past said second weatherstrip, said drain trough means being engageable with said first weatherstrip deflectable portion to deflect the latter toward said lower wall to provide a secondary seal between said headers.

3. In combination, a vehicle body header having inner and outer sides and a wall portion defining its lower edge, said wall portion having a shoulder thereon intermediate said inner and outer body header sides, a laterally opening weatherstrip retention channel formed in said inner side above said wall portion, a first weatherstrip having a base portion received in said channel and a deflectable lip portion extending below said header wall portion and in the general direction of said outer side, a door header including weatherstrip retention means, a second weatherstrip retained by said door header weatherstrip retention means and having a deflectable portion engageable with said shoulder on said body header wall portion to provide an outer seal between said headers, and drain trough means on said door header adapted to catch water seepage past said second weatherstrip, said drain trough means being engageable with said first weatherstrip deflectable lip portion to urge the latter toward said wall portion to provide a seal between said headers inwardly of said outer seal.

4. In combination, a vehicle body header having inner and outer sides and a wall portion defining the lower edge thereof, said wall portion having a shoulder thereon intermediate said inner and outer body header sides, a laterally opening weatherstrip retention means formed in said inner side above said wall portion, the first weatherstrip having a body portion retained within said channel, said first weatherstrip having a deflectable portion extending exteriorly of said channel below and in spaced relation to said wall portion in the general direction of the outer side of said header, a door header having an inner, an outer and a top side, a weatherstrip retention channel on said top side, a second weatherstrip having a base portion received in said channel and a deflectable portion extending upwardly, said deflectable portion being engageable with said shoulder on said body header wall portion to provide an outer seal between said headers, and drain trough means on said door header adapted to catch water seepage past said second weatherstrip, said drain trough means being engageable with said first weatherstrip deflectable portion to provide a seal between said headers inwardly of said outer seal.

5. In combination, a vehicle body header having inner and outer sides, a weatherstrip retention channel having a laterally extending lower wall formed in said inner side, a first weatherstrip having a base portion received in said channel and a deflectable lip portion extending below said lower wall and in the general direction of said outer side, a door header having an inner, an outer and a top side, a weatherstrip retention channel on said top side, a second weatherstrip having a base portion received in said door header channel and a deflectable lip portion extending upwardly for engagement with said body header lower wall to provide an outer seal between said headers, and drain trough means on said door header adapted to catch water seepage past said second weatherstrip, said drain trough means being engageable with said first weatherstrip deflectable lip portion to provide a seal between said headers inwardly of said outer seal.

6. In combination, a vehicle body header having inner and outer sides, a weatherstrip retention channel having a laterally extending lower wall formed in said inner side, a first weatherstrip having a base portion received in said channel and a deflectable lip portion extending below said lower wall and in the general direction of said outer side, a door header having an inner, an outer and a top side, a weatherstrip retention channel on said top side, a second weatherstrip having a base portion received in said door header channel and a deflectable lip portion extending upwardly for engagement with said body header lower wall to provide an outer seal between said headers, and drain trough means on said door header adapted to catch water seepage past said second weatherstrip, said drain trough means being engageable with said first weatherstrip deflectable lip portion to provide a seal between said headers inwardly of said outer seal, said base portion of said first weatherstrip having groove means therein adapted to receive vehicle body roof headlining fabric.

References Cited in the file of this patent
UNITED STATES PATENTS

| | | |
|---|---|---|
| 2,919,478 | Sehn | Jan. 5, 1960 |
| 2,955,875 | Dominick | Oct. 11, 1960 |
| 2,994,555 | McClune | Aug. 1, 1961 |